United States Patent
Miyazaki et al.

(10) Patent No.: US 9,450,222 B2
(45) Date of Patent: Sep. 20, 2016

(54) ELECTRIC STORAGE DEVICE, AND VEHICLE MOUNTED ELECTRIC STORAGE SYSTEM

(71) Applicant: GS Yuasa International Ltd., Kyoto-shi, Kyoto (JP)

(72) Inventors: Akihiko Miyazaki, Kyoto (JP); Sumio Mori, Kyoto (JP)

(73) Assignee: GS Yuasa International Ltd., Kyoto (JP)

(*) Notice: Subject to any disclaimer, the term of this patent is extended or adjusted under 35 U.S.C. 154(b) by 355 days.

(21) Appl. No.: 14/037,729

(22) Filed: Sep. 26, 2013

(65) Prior Publication Data

US 2014/0091760 A1   Apr. 3, 2014

(30) Foreign Application Priority Data

Sep. 28, 2012 (JP) .................................. 2012-217952
Aug. 30, 2013 (JP) .................................. 2013-180098

(51) Int. Cl.
*H01M 2/16* (2006.01)
*H01M 2/18* (2006.01)

(52) U.S. Cl.
CPC .............. *H01M 2/16* (2013.01); *H01M 2/166* (2013.01); *H01M 2/1686* (2013.01); *H01M 2/18* (2013.01); *H01M 2220/20* (2013.01); *Y02E 60/122* (2013.01)

(58) Field of Classification Search
CPC ........................... H01M 10/0525; H01M 2/16
USPC ......................................... 429/246; 320/109
See application file for complete search history.

(56) References Cited

U.S. PATENT DOCUMENTS

| 5,989,747 A | 11/1999 | Tanaka et al. |
| 6,054,010 A | 4/2000 | Tanaka et al. |
| 6,193,946 B1 * | 2/2001 | Kawano ................. C01G 51/42 423/594.4 |

(Continued)

FOREIGN PATENT DOCUMENTS

| JP | 10-079245 | 3/1998 |
| JP | 10-188952 | 7/1998 |

(Continued)

OTHER PUBLICATIONS

Extended European Search Report dated Feb. 6, 2014 filed in the corresponding European patent application No. 13186389.6.

(Continued)

*Primary Examiner* — Samuel Berhanu
*Assistant Examiner* — Tessema Kebede
(74) *Attorney, Agent, or Firm* — Rankin, Hill & Clark LLP

(57) ABSTRACT

Provided is an electric storage device provided with: a positive electrode including a positive electrode substrate and a positive electrode mixture layer, the positive electrode mixture layer being formed on the positive electrode substrate and containing a positive electrode active material; a negative electrode including a negative electrode substrate and a negative electrode mixture layer, the negative electrode mixture layer being formed on the negative electrode substrate and containing a negative electrode active material; and a separator disposed between the positive electrode and the negative electrode. In the electric storage device, the separator yields a triple value of standard deviation of local air resistance, as measured within a 5-mm diameter circle, of at least 20 seconds/10 cc but not more than 350 seconds/10 cc.

9 Claims, 10 Drawing Sheets

(56) References Cited

U.S. PATENT DOCUMENTS

| | | |
|---|---|---|
| 6,234,225 B1 | 5/2001 | Tanaka et al. |
| 2005/0191545 A1 | 9/2005 | Bowles et al. |
| 2006/0019154 A1 | 1/2006 | Imachi et al. |
| 2006/0103055 A1* | 5/2006 | Hoshuyama ....... B01D 67/0027 264/479 |
| 2007/0048607 A1 | 3/2007 | Nakashima et al. |
| 2009/0226813 A1* | 9/2009 | Takita ................ B01D 67/0083 429/247 |
| 2010/0178544 A1 | 7/2010 | Nishikawa |
| 2011/0039145 A1* | 2/2011 | Abe ....................... H01M 2/145 429/144 |
| 2011/0236737 A1 | 9/2011 | Zhao et al. |
| 2011/0305940 A1 | 12/2011 | Usami et al. |
| 2012/0015238 A1* | 1/2012 | Minami ................ H01M 2/166 429/163 |
| 2012/0135312 A1 | 5/2012 | Takahashi |
| 2012/0135317 A1 | 5/2012 | Nakashima et al. |
| 2012/0141885 A1 | 6/2012 | Nakashima et al. |
| 2012/0141886 A1 | 6/2012 | Nakashima et al. |
| 2012/0141887 A1 | 6/2012 | Nakashima et al. |
| 2013/0069591 A1* | 3/2013 | Iyasu .................... H02J 7/1461 320/109 |
| 2014/0017549 A1 | 1/2014 | Miyazaki et al. |
| 2014/0356730 A1* | 12/2014 | Sawada ............... B29C 47/0004 429/247 |

FOREIGN PATENT DOCUMENTS

| | | |
|---|---|---|
| JP | 2005-228512 | 8/2005 |
| JP | 2006-032246 | 2/2006 |
| JP | 2007-265666 | 10/2007 |
| JP | 2008-243658 | 10/2008 |
| JP | 2009-135540 | 6/2009 |
| JP | 2010-205827 | 9/2010 |
| JP | 2011-100925 | 5/2011 |
| WO | 2013/080876 | 6/2013 |

OTHER PUBLICATIONS

Extended European Search Report dated Nov. 13, 2013 filed in European application No. 13175897.1.

* cited by examiner

F I G. 2
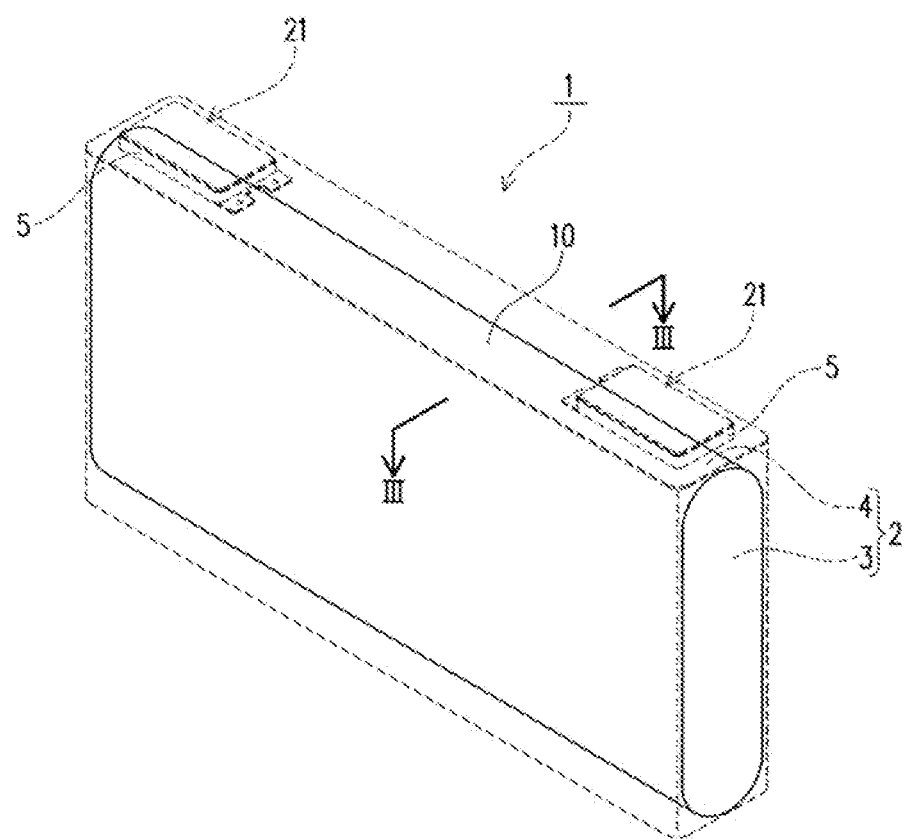

F I G. 6
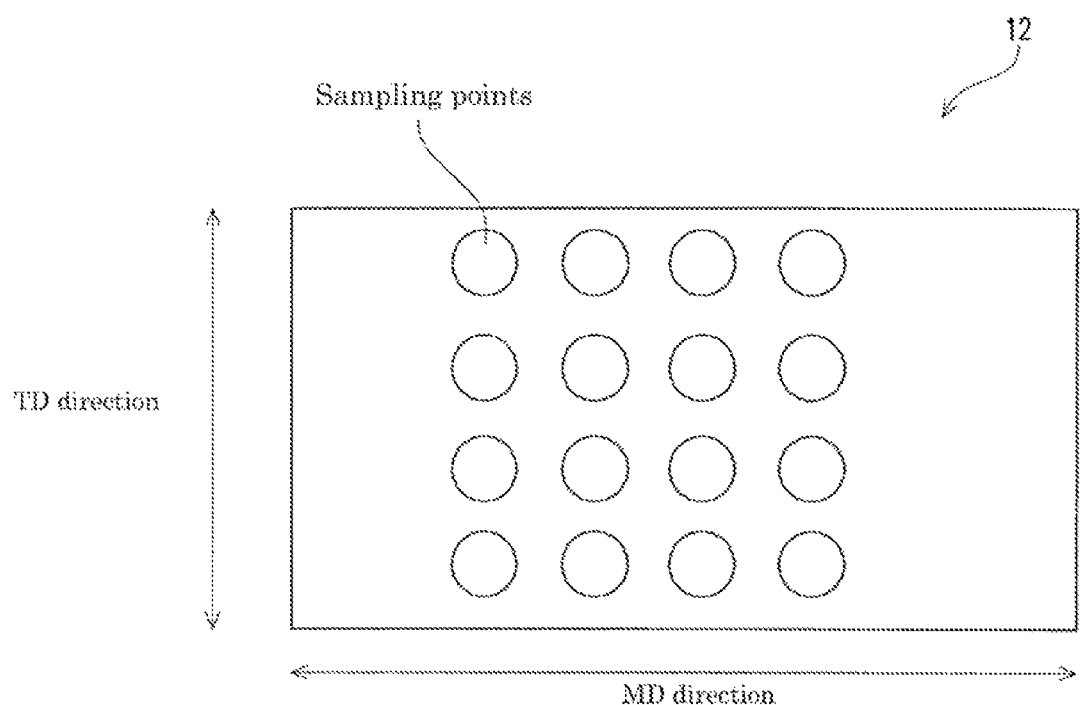

F I G. 7
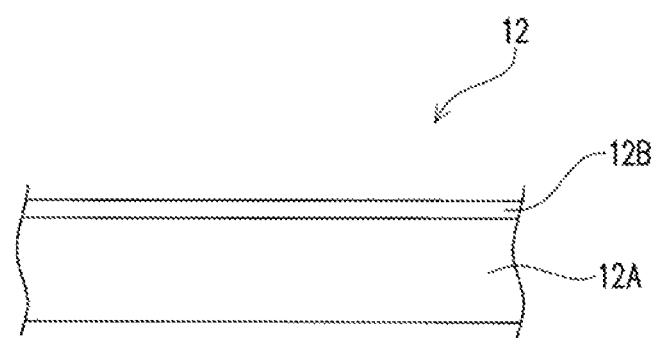

F I G. 8
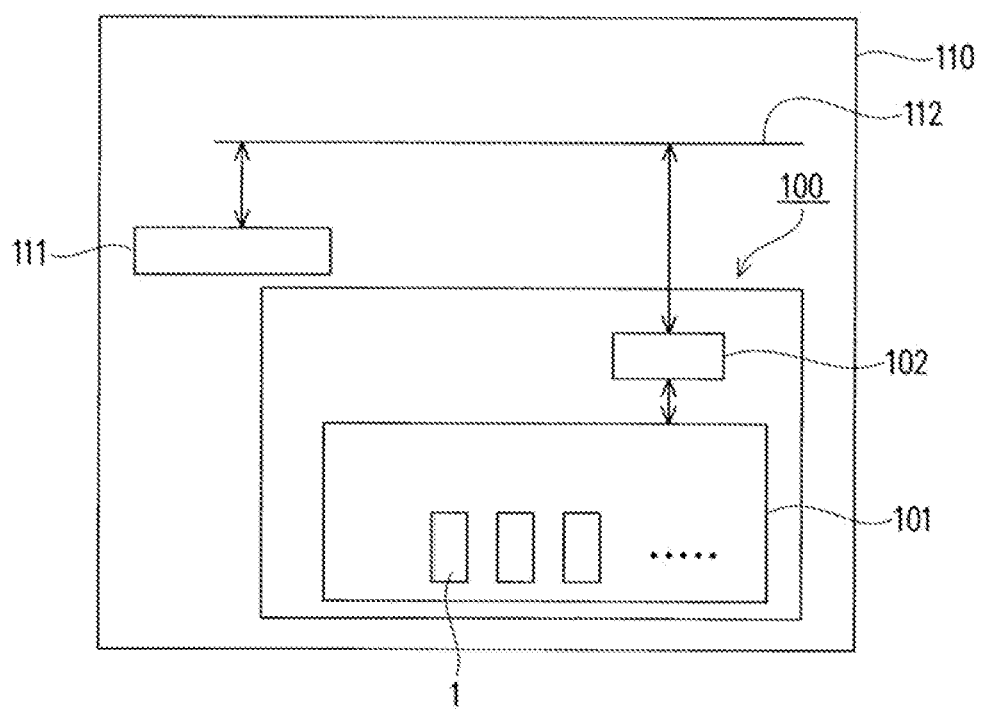

ELECTRIC STORAGE DEVICE, AND VEHICLE MOUNTED ELECTRIC STORAGE SYSTEM

CROSS-REFERENCE TO RELATED APPLICATIONS

This application claims the benefit of Japanese Patent Application Nos. 2012-217952 and 2013-180098, filed on Sep. 28, 2012 and Aug. 30, 2013, respectively, which are incorporated herein by reference.

FIELD

The present invention relates to an electric storage device, and a vehicle mounted electric storage system. More specifically, the present invention relates to an electric storage device including a positive electrode containing a positive electrode active material, a negative electrode containing a negative electrode active material, and a separator disposed between the positive electrode and the negative electrode, and to a vehicle mounted electric storage system.

BACKGROUND

Recently, rechargeable electric storage devices such as battery cells, e.g., lithium ion cells and nickel hydrogen cells, and capacitors, e.g., electric double layer capacitors, are employed as a power source for vehicles, e.g., cars and motorcycles, or various appliances, e.g., mobile terminals and laptop computers. Such an electric storage device is disclosed, for example, in JP 2007-265666 A.

JP 2007-265666 A discloses a non-aqueous electrolyte secondary cell using a separator in which clogging is less likely to occur even if a charge-discharge cycle is repeated. JP 2007-265666 A discloses a non-aqueous electrolyte secondary cell in which the compression resistance rate per unit film thickness is not more than 100 seconds/μm, when the separator has a compressibility of 20%, for the purpose of providing a non-aqueous electrolyte secondary cell with excellent load characteristics and cycle characteristics. JP 2007-265666 A discloses that the compressibility of the separator is defined as: (film thickness before compression of separator—film thickness after compression of separator)/(film thickness before compression of separator)×100, and the compression resistance rate of the separator is defined as: (air resistance after compression of separator—air resistance before compression of separator)/(film thickness before compression of separator—film thickness after compression of separator)×100, in which the air resistance is measured to in accordance with a measurement method prescribed in JIS P8117.

Since the non-aqueous electrolyte secondary cell of JP 2007-265666 A uses a separator having an excellent compression resistance, the air resistance of the separator is less likely to increase even if the separator is compressed by swelling of the positive plate and the negative plate with the evolution of the charge-discharge cycle, and therefore clogging is less likely to occur in the separator. Accordingly, the ion conductance of the separator is hard to decrease in the non-aqueous electrolyte secondary cell of JP 2007-265666 A. Thus, the above-mentioned purpose is achieved.

In this way, JP 2007-265666 A discloses a non-aqueous electrolyte secondary cell for achieving excellent cycle characteristics after repetition of the charge-discharge cycle.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The inventors have found a new problem that the above-mentioned non-aqueous electrolyte secondary cell disclosed in JP 2007-265666 A undergoes a temporary reduction in output power (which hereinafter may be referred to also as temporary deterioration) immediately after repeating the charge-discharge cycle (e.g., within two hours after the completion of the cycle). The inventors have found also that this problem is unique to electric storage devices that are repeatedly subjected to charge and discharge, and that such problem significantly appears in vehicle mounted non-aqueous electrolyte secondary cells, particularly in lithium ion cells for hybrid vehicles.

That is, JP 2007-265666 A mentions deterioration occurring in the cell due to swelling and shrinking of polar plates following repetition of a cycle. Such deterioration is expected to be significant in a cycle having a wide range of SOC (State Of Charge: the charge state of battery cells). On the other hand, the temporary deterioration raised as an issue in the subject application is found to be significant, as a result of studies by the inventors, in a cycle having a narrowed SOC range, and to be further significant in a high current cycle at 10 C or more (where 1 C is a rate that allows charge (discharge) to a rated capacity to be completed within one hour). Meanwhile, it has been revealed that the cell rather recovers from the deterioration by being subjected to a full charge-discharge cycle at low rate. This deterioration is a different phenomenon from general, cycle-dependent deterioration raised as a problem in JP 2007-265666 A. This kind of phenomenon is likely to occur in a use environment such as in a vehicle mounted use environment, particularly, in a use environment in which a high current cycle with a narrow SOC range is repeated as in hybrid vehicles.

It is an object of the present invention to provide an electric storage device and a vehicle mounted electric storage system, which can reduce the temporary deterioration.

The electric storage device according to an aspect of the present invention is provided with: a positive electrode including a positive electrode substrate and a positive electrode mixture layer, the positive electrode mixture layer being formed on the positive electrode substrate and containing a positive electrode active material; a negative electrode including a negative electrode substrate and a negative electrode mixture layer, the negative electrode mixture layer being formed on the negative electrode substrate and containing a negative electrode active material; and a separator disposed between the positive electrode and the negative electrode, wherein the separator yields a triple value of standard deviation of local air resistance, as measured within a 5-mm diameter circle, of at least 20 seconds/10 cc but not more than 350 seconds/10 cc.

BRIEF DESCRIPTION OF DRAWINGS

The foregoing and other features of the present invention will become apparent from the following description and drawings of an illustrative embodiment of the invention in which:

FIG. 2 is a perspective view schematically showing an inside of a case of the non-aqueous electrolyte secondary cell;

FIG. 6 is a plan view schematically showing points measured for local air resistance of a separator in this embodiment;

FIG. 7 is an enlarged simplified view (sectional view) schematically showing the separator that constitutes the power generating element in this embodiment;

FIG. 8 is a simplified view showing an electric storage system of this embodiment mounted on a vehicle;

DESCRIPTION OF EMBODIMENTS

Figure 1:
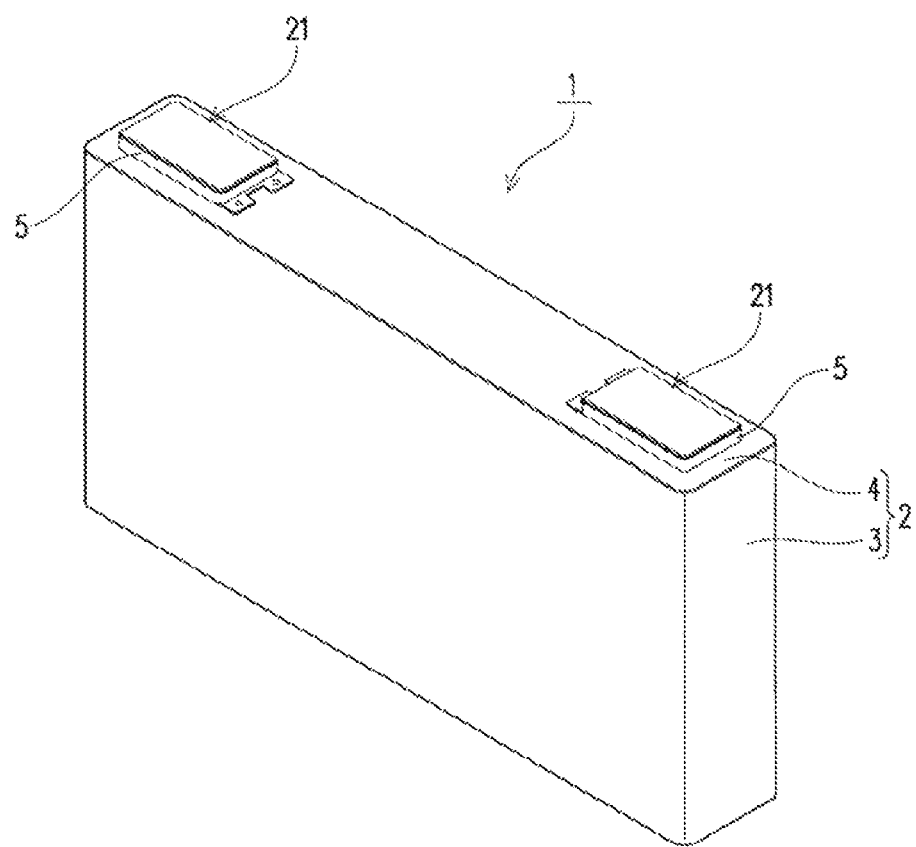
FIG. 1 is a perspective view schematically showing a non-aqueous electrolyte secondary cell as an example of the electric storage device of this embodiment.

An electric storage device according to this embodiment includes: a positive electrode including a positive electrode substrate and a positive electrode mixture layer, the positive electrode mixture layer being formed on the positive electrode substrate and containing a positive electrode active material; a negative electrode including a negative electrode substrate and a negative electrode mixture layer, the negative electrode mixture layer being formed on the negative electrode substrate and containing a negative electrode active material; and a separator disposed between the positive electrode and the negative electrode, wherein the separator yields a triple value of standard deviation of local air resistance, as measured within a 5-mm diameter circle, of at least 20 seconds/10 cc but not more than 360 seconds/10 cc. Here, the air resistance means the time required for a gas with a specific volume to permeate an object (where the unit is second/cc).

As a result of extensive studies on a method for reducing the temporary deterioration, the inventors have found that at least the local air resistance of the separator is associated with the method for reducing the temporary deterioration.

The local air resistance of the separator is determined by measuring the resistance to permeation of a constant amount of the air using a Gurley-type densometer, with the separator being clamped in a jig for reducing the diameter of an air orifice (for example, to 5 mm) from the diameter employed in a normal air resistance-measuring method (JIS P811.7).

As a result of diligent investigation, the inventors have found that the temporary deterioration in battery cells is correlated with a triple value of standard deviation of the values obtained by measuring the local air resistance a prescribed number of times at prescribed points (which hereinafter may be referred to also as a 3σ value of local air resistance or as a 3σ value). Then, the inventors further have studied on an optimal range of the 3σ value of the local air resistance of the separator for reducing the temporary deterioration, thereby arriving at the present invention.

As a results of extensive studies, the inventors have found that it is possible to reduce the temporary deterioration by reducing unevenness in state of charge when a 3σ value of the local air resistance of the separator is at least 20 seconds/10 cc but not more than 350 seconds/10 cc. Accordingly, the electric storage device of this embodiment makes it possible to reduce the temporary deterioration.

In the above-mentioned electric storage device, the separator preferably has an air resistance of at least 30 seconds/100 cc but not more than 130 seconds/100 cc. This can further reduce the temporary deterioration of the electric storage device, and also can further improve the performance of the electric storage device, for example, in ensuring the safety and avoiding micro short circuits.

In the above-mentioned electric storage device, the separator preferably has a thickness of at least 15 μm but not more than 24 μm. This can further reduce the temporary deterioration of the electric storage device, and also can further improve the performance of the electric storage device, for example, in ensuring the safety, avoiding micro short circuits, and adjusting the input power characteristics.

In the above-mentioned electric storage device, the negative electrode active material preferably contains hard carbon. This can further reduce the temporary deterioration of the electric storage device.

In the above-mentioned electric storage device, the separator preferably includes: a sheet substrate containing a resin; and an inorganic layer having a higher content of inorganic particles than the substrate. The inorganic layer is preferably disposed on at least one surface side of the substrate.

In the above-mentioned electric storage device, the negative electrode active material preferably has a D50-particle size of at least 2 μm but less than 8 μm. This can further reduce the temporary deterioration of the electric storage device, and also can further improve the performance of the electric storage device, for example, in ensuring the safety.

In the above-mentioned electric storage device, a ratio of a D90-particle size of the negative electrode active material with respect to the thickness of the negative electrode mixture layer is preferably at least 0.1 but not more than 0.5. This can further reduce the temporary deterioration of the electric storage device.

In the above-mentioned electric storage device, it is preferable that: the triple value of the standard deviation of the local air resistance be at least 50 seconds/10 cc but not more than 350 seconds/10 cc; the separator have an air resistance of at least 30 seconds/100 cc but not more than 130 seconds/100 cc; the separator have a thickness of at least 15 μm but not more than 24 μm; the negative electrode active material be hard carbon; the negative electrode active material have a D50-particle size of at least 2 μm but less than 8 μm; a ratio of a D90-particle size of the negative electrode active material with respect to the thickness of the negative electrode mixture layer is at least 0.1 but not more than 0.5.

This can more effectively reduce the temporary deterioration that is remarkable in use on vehicles, and also can further effectively improve the performance of the electric storage device in ensuring the safety, avoiding micro short circuits, and adjusting the input power characteristics.

Hereinafter, one embodiment of the electric storage device of the present invention is described with reference to the drawings. It should be noted that the same or corresponding portions are denoted by the same reference numerals in the following drawings, and the description thereof is not repeated.

Electric Storage Device of the Present Embodiment

With reference to FIG. 1 to FIG. 7, a non-aqueous electrolyte secondary cell 1 is described as an example of the electric storage device of the present embodiment. The non-aqueous electrolyte secondary cell 1 is preferably intended for use on vehicles, more preferably intended for use on hybrid vehicles.

Figure 3:
FIG. 3 is a sectional view, taken along the line III-III of FIG. 2, schematically showing the inside of the case of the non-aqueous electrolyte secondary cell.

As shown in FIG. 1 to FIG. 3, the non-aqueous electrolyte secondary cell 1 of this embodiment includes a case 2, a power generating element (electrode assembly) 10 housed in the case 2, an electrolyte housed in the case 2, an external gasket 5 attached to the case 2, and an external terminal 21 electrically connected to the power generating element 10.

As shown in FIG. 1, the case 2 has a body 3 housing the power generating element 10 and a cover plate 4 covering the body 3. The body 3 and the cover plate 4 are formed, for example, of stainless steel plates, and welded to each other.

The external gasket 5 is arranged on the outer surface of the cover plate 4. The cover plate 4 has two openings. The external gasket 5 has one opening. The cover plate 4 is arranged so as to have one opening in communication with the opening of the external gasket 5. A part of the external terminal 21 is arranged inside the one opening of the cover plate 4 and the opening of the external gasket 5.

The external terminal 21 is connected to a current collector arranged in the case 2. The current collector is connected to the power generating element 10 arranged in the case 2. That is, the external terminal 21 is connected to the power generating element 10 arranged in the case 2 via the current collector arranged in the case 2.

The shape of the current collector, for example, is a plate, though not specifically limited thereto. The external terminal 21 is formed, for example, of aluminum metal materials such as aluminum and aluminum alloys.

The external gasket 5 is provided for each of the positive electrode and the negative electrode. Further, the external terminal 21 is also provided for each of the positive electrode and the negative electrode.

The external gasket 5 and the external terminal 21 for the positive electrode are arranged on one end side in the longitudinal direction of the cover plate 4. On the other hand, the external gasket 5 and the external terminal 21 for the negative electrode are arranged on the other end side in the longitudinal direction of the cover plate 4.

As shown in FIG. 2 and FIG. 3, the body 3 houses the power generating element 10 thereinside. The case 2 may house one power generating element, or may house a plurality of power generating elements. In the latter case, the plurality of the power generating elements 10 are electrically connected in parallel.

Figure 4:
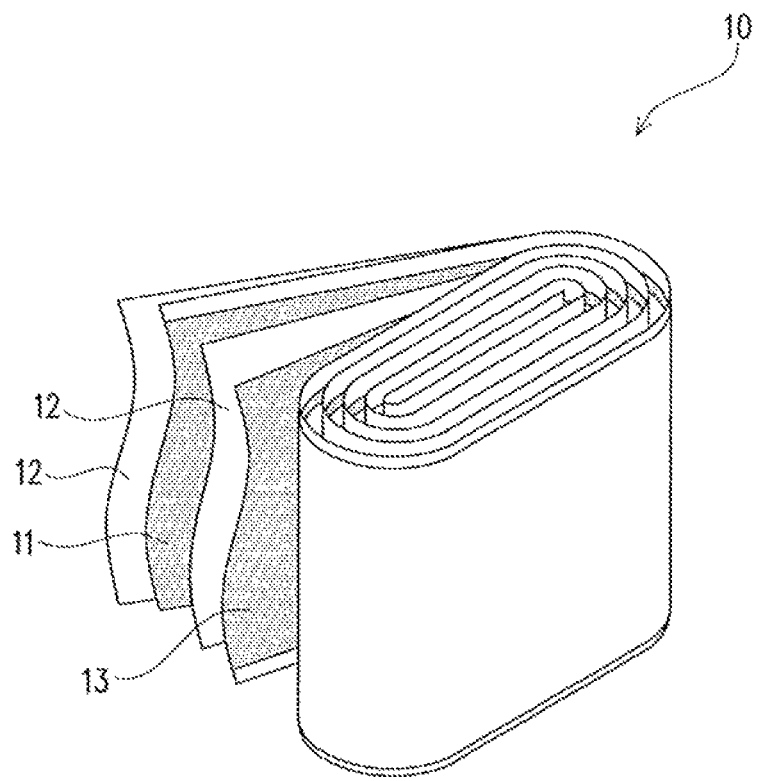
FIG. 4 is a simplified view schematically showing a power generating element that constitutes the non-aqueous electrolyte secondary cell.

As shown in FIG. 4, each power generating element 10 includes a positive electrode 11, separators 12, and a negative electrode 13. The power generating element 10 is formed into a roll by being rolled up, with one separator 12 being disposed on the negative electrode 13, the positive electrode 11 being disposed on the separator 12, and another separator 12 being disposed on the positive electrode 11. That is, the one separator 12 is disposed on the outer circumferential side of the negative electrode 13, the positive electrode 11 is disposed on the outer circumferential side of the one separator 12, and the other separator 12 is disposed on the outer circumferential side of the positive electrode 11, in the power generating element 10. In this embodiment, since an insulating separator is disposed between the positive electrode 11 and the negative electrode 13, the positive electrode 11 and the negative electrode 13 are not electrically connected to each other in the power generating element 10.

Figure 5:
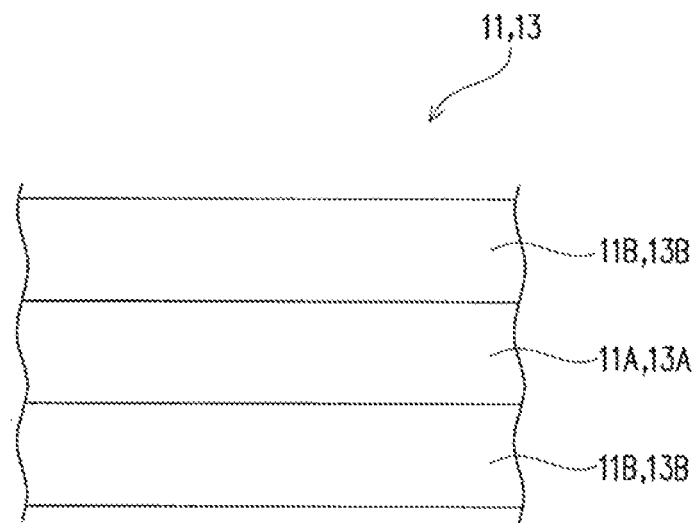
FIG. 5 is an enlarged simplified view (sectional view) schematically showing a positive electrode or a negative electrode that constitutes the power generating element in this embodiment.

As shown in FIG. 5, the positive electrode 11 that constitutes the power generating element 10 includes a positive electrode current collecting foil 11A and a positive electrode mixture layer 11B formed on the positive electrode current collecting foil 11A. The negative electrode 13 that constitutes the power generating element 10 includes a negative electrode current collecting foil 13A and a negative electrode mixture layer 13B formed on the negative electrode current collecting foil 13A.

In this embodiment, the positive electrode mixture layer 11B and the negative electrode mixture layer 13B are respectively formed on each of both sides of the positive electrode current collecting foil 11A and the negative electrode current collecting foil 13A. However, the present invention is not specifically limited to such a structure. For example, the positive electrode mixture layer 11B and the negative electrode mixture layer 13B may be formed respectively on either side of the positive electrode current collecting foil 11A and the negative electrode current collecting foil 13A. However, the positive electrode mixture layer 11B and the negative electrode mixture layer 13B are required to face each other.

In this embodiment, the positive electrode current collecting foil and the negative electrode current collecting foil are described respectively as a positive electrode substrate and a negative electrode substrate, for example. However, in the present invention, the shapes of the positive electrode substrate and the negative electrode substrate are not limited to a foil shape.

The positive electrode mixture layer 11B contains a positive electrode active material, a conductive aid, and a binder. The negative electrode mixture layer 13B contains a negative electrode active material and a binder. The negative electrode mixture layer 13B may further contain a conductive aid.

The positive electrode active material is preferably a lithium composite is oxide, though not specifically limited thereto. Particularly, the positive electrode active material is more preferably one represented by $Li_aNi_bM1_cM2_dW_xNb_yZr_zO_2$ (however, in the formula: a, b, c, d, x, y, and z satisfy $0 \leq a \leq 1.2$, $0 \leq b \leq 1$, $0 \leq c \leq 0.5$, $0 \leq d \leq 0.5$, $0 \leq x \leq 0.1$, $0 \leq y \leq 0.1$, $0 \leq z \leq 0.1$, and $b+c+d=1$; and M1 and M2 are each at least one element selected from the group consisting of Mn, Ti, Cr, Fe, Co, Cu, Zn, Al, Ge, Sn, and Mg).

The negative electrode active material preferably contains hard carbon, more preferably consists of hard carbon.

In the case where the negative electrode active material contains hard carbon and other materials, examples of the other materials include carbon materials, and additionally include elements that can be alloyed with lithium, alloys, metal oxides, metal sulfides, and metal nitrides.

Examples of the carbon materials include hard carbon, soft carbon, and graphite.

Examples of the elements that can be alloyed with lithium include Al, Si, Zn, Ge, Cd, Sn, and Pb.

One of these may be contained alone, or two or more of these may be contained therein.

Examples of the alloys include an alloy containing a transition metal element such as Ni—Si alloy and Ti—Si alloy.

Examples of the metal oxides include amorphous tin oxide such as $SnBo_{0.4}P_{0.6}O_{3.1}$, silicon tin oxide such as $SnSiO_3$, silicon oxide such as SiO, and lithium titanate having a spinel structure such as $Li_{4+x}Ti_5O_{12}$.

Examples of the metal sulfides include lithium sulfide such as $TiS_2$, molybdenum sulfide such as $MoS_2$, and iron sulfide such as FeS, $FeS_2$, and $Li_xFeS_2$.

Among these, hard carbon, specifically, hard carbon having a D50-particle size of less than 8 μm is particularly preferable.

The negative electrode active material preferably has a D50-particle size of at least 2 μm but less than 8 μm, more preferably a D50-particle size of at least 2 μm but less than 6 μm, further preferably a D50-particle size of at least 2 μm but less than 5 μm. When the negative electrode active material has a particle size within the above-mentioned range, the temporary deterioration of the electric storage device can be reduced further, and the safety and output power of the electric storage device can be enhanced.

The above-mentioned D50-particle size of the negative electrode active material means a particle size (D50) at 50% by volume in the particle volume distribution as determined by a laser diffraction light-scattering method.

The ratio of a D90-particle size of the negative electrode active material with respect to the thickness of the negative electrode mixture layer is preferably at least 0.1 but not more than 0.5, more preferably at least 0.2 but not more than 0.4. When this ratio falls within the above-mentioned range, the temporary deterioration can be reduced further.

The above-mentioned ratio of the D90-particle size of the negative electrode active material with respect to the thickness of the negative electrode mixture layer is a value expressed as: a particle size (D90) at 90% by volume in the particle volume distribution as determined by a laser diffraction light-scattering method/the thickness of the negative electrode mixture layer.

Examples of the binder include polyacrylonitrile, polyvinylidene fluoride (PVDF), a copolymer of vinylidene fluoride and hexafluoropropylene, polytetrafluoroethylene, polyhexafluoropropylene, polyethylene oxide, polypropylene oxide, polyphosphazen, polysiloxane, polyvinyl acetate, polyvinyl alcohol, polymethylmethacrylate, polyacrylic acid, polymethacrylic acid, styrene-butadiene rubber, nitrile-butadiene rubber, polystyrene, and polycarbonate, though not specifically limited thereto.

In view of electrochemical stability, the binder is preferably at least one of polyacrylonitrile, polyvinylidene fluoride, polyhexafluoropropylene, and polyethylene oxide, more preferably at least one of PVDF, polyacrylic acid, polymethacrylic acid, and styrene-butadiene rubber.

The separator 12 is disposed between the positive electrode and the negative electrode. In the separator, the 3σ value of the local air resistance in the Gurley air resistance test is at least 20 seconds/10 cc but not more than 350 seconds/10 cc. This 3σ value is preferably at least 50 seconds/10 cc but not more than 350 seconds/10 cc, more preferably at least 120 seconds/10 cc but not more than 200 seconds/10 cc.

Here, the above-mentioned 3σ value is a value of 3σ calculated from the measured values obtained by inserting a dedicated jig into a Gurley-type densometer (with an air orifice having a diameter of 28.6 mm) to adjust the diameter of the air orifice to 5 mm and measuring the time required for a 10-cc air to pass through the air orifice (local air resistance) in accordance with JIS P8117.

The symbol a denotes the standard deviation of a normal distribution in statistics. The 3σ value is a numerical value obtained by multiplying the standard deviation by 3, and the probability for an expected value to fall within the range of ±3σ is about 99.7%. The measurement is performed by sampling the separator that has been cut into a width for use in battery cells, for example, at 16 points shown in FIG. 6.

In FIG. 6, the MD direction means a direction in which a raw material for the separator is conveyed so as to be formed into a sheet, and the TD direction means a direction perpendicular to the MD direction along the surface of the sheet.

Sampling points in the TD direction, for example, are equally spaced 4 points (in the case where the length in the TD direction is short, a possible maximum number of points), and sampling points in the MD direction, for example, are points spaced at 15 mm or more from one another.

The above-mentioned 3σ value is affected, for example, by the distribution of openings, the distribution of basis weight in the MD direction and the TD direction, the curved path length, and the air resistance values of the separator. In the examples described later, a separator having an intended 3σ value of the local air resistance was prepared by using a wet microporous film and varying the draw ratio of a resin, the mix ratio of a plasticizer, the cut-out portion in the TD direction of the raw material sheet of the separator, etc. However, the separator having an adjusted 3σ value of the local air resistance is not limited to above, and examples thereof include paper, nonwoven fabrics, and microporous films formed, for example, by a drylaying process or a burst fiber process. Further, in the case of the separator including the later-mentioned inorganic layer, it is also possible to adjust the above-mentioned 3σ value by varying the drying speed, the solid content ratio of a coating agent, and the binder mixing ratio of the inorganic layer.

The separator 12 preferably has an air resistance of at least 30 seconds/100 cc but not more than 130 seconds/100 cc, more preferably at least 90 seconds/100 cc but not more than 120 seconds/100 cc. This can further reduce the temporary deterioration of the electric storage device and also can further improve the performance of the electric storage device, for example, in ensuring the safety and avoiding micro short circuits.

The above-mentioned air resistance is a value measured in accordance with JIS P8117.

The separator 12 preferably has a thickness of at least 1.5 μm but not more than 24 μm, more preferably at least 20 μm but not more than 24 μm. This can further reduce the temporary deterioration of the electric storage device and also can further improve the performance of the electric storage device, for example, in ensuring the safety, avoiding micro short circuits, and adjusting the input power characteristics.

For example, as shown in FIG. 7, the separator 12 includes a sheet substrate 12A and an inorganic layer 12B, formed on one surface of the substrate 12A, containing inorganic particles with a higher content of the inorganic particles than the substrate 12A.

As described later in the examples, it is effective to decrease the air resistance or the local air resistance of the separator 12 for achieving high output power and resistance to temporary deterioration of battery cells. However, in the case of using a thermoplastic resin as a material for the separator, the separator having increased permeability tends to have large thermal shrinkage, which may possibly result in a decrease in safety when used as battery cells. In contrast, it is possible to suppress thermal shrinkage of the separator by disposing the inorganic layer 12B on the substrate 12A of the separator using a method such as coating. Thus, improvement in safety of battery cells is enabled. From such a viewpoint, it is desirable to dispose the inorganic layer 12B on the substrate 12A.

In the case where the separator 12 includes the substrate 12A and the inorganic layer 12B mentioned above, the substrate 12A is not specifically limited, and general resin porous films, for example, can be used therefor.

As the substrate 12A, woven fabrics of synthetic fibers, natural fibers, hydrocarbon fibers, glass fibers, or ceramic fibers, or nonwoven fabrics of these fibers, for example, can be used. The substrate 12A preferably contains a woven fabric or nonwoven fabric, or preferably contains a woven fabric of synthetic fibers or a nonwoven fabric of synthetic fibers, and is more preferably a woven fabric of synthetic fibers or a nonwoven fabric of synthetic fibers. As the substrate 12A, a raised woven fabric (fleece), for example, can be used.

Further, the substrate 12A preferably contains non-conductive fibers of a polymer selected from: polyacrylonitrile (PAN): polyamide (PA); polyester such as polyethylene terephthalate (PET); polyolefin (PO) such as polypropylene (PP) and polyethylene (PE); and a mixture of such polyolefin.

Further, the substrate 12A, for example, may be a polyolefin microporous film, a nonwoven fabric, or paper. The substrate 12A is preferably a polyolefin microporous film (porous polyolefin layer).

As the porous polyolefin layer, polyethylene, polypropylene, or a composite film of these can be used.

In consideration of the influence on the performance of battery cells, the substrate 12A preferably has a thickness of 15 to 24 μm. The thickness of the substrate 12A is preferably 1.5 to 15 times the thickness of the inorganic layer 12B.

The inorganic layer 12B contains at least inorganic particles. Further, the inorganic layer 12B may further contain a binder, or the like.

The inorganic particles are preferably composed of a single substance, a mixture, or a composite compound of at least one of the following inorganic substances, though not specifically limited thereto.

Specifically, examples of the inorganic particles include particles of metal oxide such as iron oxide, $SiO_2$, $Al_2O_3$, $TiO_2$, $BaTiO_2$, ZrO, and alumina-silica composite oxide; particles of nitride such as aluminum nitride and silicon nitride; particles of a poorly soluble ionic crystal material such as calcium fluoride, barium fluoride, and barium sulfate; particles of a covalent crystal material such as silicon and diamond; particles of clay such as talc and montmorillonite; and particles of a material derived from mineral resources such as boehmite, zeolite, apatite, kaolin, mullite, spinel, olivine, sericite, bentonite, and mica, and an artificial material thereof.

Further, the inorganic particles may be: metal particles; particles of metal oxide such as $SnO_2$ and tin-indium oxide (ITO); or particles to which electrically insulating properties have been imparted by treating the surface of particles of an electrically conductive material, e.g., particles of a carbon material such as carbon black and graphite, with an electrically insulating material (e.g., materials mentioned above for the electrically insulating inorganic particles).

The inorganic particles are preferably at least one kind of particles of $SiO_2$, particles of $Al_2O_3$, and particles of alumina-silica composite oxide.

The same binder as in the positive electrode and the negative electrode is employed as the binder of the inorganic layer 12B.

Further, the substrate 12A and the inorganic layer 12B each may be composed of a plurality of layers.

Subsequently, a method for producing the above-mentioned non-aqueous electrolyte secondary cell 1 is described.

First, a method for producing the power generating element 10 is described.

In the method for producing the power generating element 10, a coating agent for forming the inorganic layer 12B is prepared, for example, by mixing inorganic particles, a binder, a thickener, a surfactant, etc., with a solvent. This coating agent is applied onto the substrate 12A, followed by drying. Thus, a separator including the substrate 12A and the inorganic layer 12B formed on the substrate 12A is produced. The surface of the substrate 12A may be treated for property modification.

Among the produced separators, those yielding a 3σ value of the local air resistance, in the Gurley air resistance test with an air orifice having a diameter set to 5 mm, of at least 20 seconds/10 cc but not more than 350 seconds/10 cc are selected as the separator 12 of this embodiment.

The positive electrode mixture is prepared, for example, by mixing a positive electrode active material, a conductive aid, and a binder, and adding this mixture to a solvent, followed by kneading. This positive electrode mixture is applied onto at least one surface of the positive electrode current collecting foil 11A, followed by drying, which thereafter is subjected to compression molding. Thus, the positive electrode 11 having the positive electrode current collecting foil 11A on which the positive electrode mixture layer 11B is formed is produced. After the compression molding, vacuum drying is performed.

The negative electrode mixture is prepared, for example, by mixing a negative electrode active material containing hard carbon with a binder, and adding this mixture to a solvent, followed by kneading. This negative electrode mixture is applied onto at least one surface of the negative electrode current collecting foil 13A, followed by drying, which thereafter is subjected to compression molding. Thus, the negative electrode 13 having the negative electrode current collecting foil 13A on which the negative electrode mixture layer 13B is formed is produced. After the compression molding, vacuum drying is performed.

Next, the positive electrode 11 and the negative electrode 13 are stacked together via the separator 12, which is then rolled up. At this time, the inorganic layer 12B of the separator 12 preferably faces the positive electrode 11. Thus, the power generating element 10 is produced. Thereafter, a current collector is attached to each of the positive electrode and the negative electrode.

Subsequently, the power generating element 10 is arranged inside the body 3 of the case 2. In the case where a plurality of power generating elements 10 are provided, the power generating elements 10, for example, are arranged inside the body 3 with their current collectors electrically connected in parallel to each other. The current collectors are each welded to the external terminal 21 arranged inside the opening of the external gasket 5 attached to the outer surface of the cover plate 4. The cover plate 4 is attached to the body 3.

Further, an electrolyte is poured into the case 2. The electrolyte, for example, is prepared by dissolving $LiPF_6$ in a mixed solvent of propylene carbonate (PC): dimethyl carbonate (DMC): ethyl methyl carbonate (EMC)=3:2:5 (volume ratio), though not specifically limited thereto. A known additive may be further added to the electrolyte.

By the above-mentioned steps, the non-aqueous electrolyte secondary cell 1 of this embodiment shown in FIG. 1 to FIG. 5 and FIG. 7 is produced.

As has been described above, the non-aqueous electrolyte secondary cell 1 as an example of the electric storage device of this embodiment is provided with: the positive electrode 11 including a positive electrode substrate and the positive electrode mixture layer 11B that is formed on the positive electrode substrate and contains a positive electrode active material; the negative electrode 13 including a negative electrode substrate and the negative electrode mixture layer 13B that is formed on the negative electrode substrate and contains a negative electrode active material; and the separator 12 disposed between the positive electrode 11 and the negative electrode 13, wherein the separator yields a triple value (3σ value) of standard deviation of local air resistance, as measured within a 5-mm diameter circle, of at least 20 seconds/10 cc but not more than 350 seconds/10 cc.

According to the non-aqueous electrolyte secondary cell 1 of this embodiment, the 3σ value of the local air resistance of the separator 12 is at least 20 seconds/10 cc but not more than 350 seconds/10 cc. Hence, unevenness in state of charge in the in-plane direction of the negative electrode can be reduced. In this way, the temporary decrease in output power (temporary deterioration) after the non-aqueous electrolyte secondary cell 1 is repeatedly subjected to a charge-discharge cycle (e.g., within two hours) at a high rate (high speed charge-discharge cycle) can be reduced.

Such temporary deterioration is possibly significant in a vehicle mounted non-aqueous electrolyte secondary cell, particularly in a lithium ion cell for hybrid vehicles, which is expected to be used in such a way as to repeat a high current cycle within a narrow SOC range. Accordingly, the non-aqueous electrolyte secondary cell 1 of this embodiment is suitably used as a lithium ion cell for hybrid vehicles. The non-aqueous electrolyte secondary cell of this embodiment is used generally for applications in which charge and discharge are repeated.

In the non-aqueous electrolyte secondary cell 1 of this embodiment, it is preferable that the negative electrode active material contain hard carbon, and it is more preferable that the negative electrode active material be hard carbon. Hard carbon can more effectively reduce the temporary deterioration than other materials.

When the negative electrode active material contains hard carbon, unevenness in state of charge within a microscopic region can be eliminated. However, unevenness in state of charge within a region with a diameter of about 5 mm is difficult to eliminate. As a countermeasure to this, it is possible to control the unevenness in state of charge that affects the temporary deterioration by using a 3σ value of the local air resistance in the Gurley air resistance test with an air orifice having a diameter of 5 mm as an indicator and controlling the 3σ value.

In the non-aqueous electrolyte secondary cell 1 of this embodiment, the separator 12 preferably has an air resistance of at least 30 seconds/1.00 cc but not more than 130 seconds/100 cc. This can further improve the performance of the non-aqueous electrolyte secondary cell 1, for example, in ensuring the safety and avoiding micro short circuits.

In the non-aqueous electrolyte secondary cell 1 of this embodiment, the above-mentioned separator preferably has a thickness of at least 15 μm but not more than 24 μm. This can further improve the performance of the non-aqueous electrolyte secondary cell 1, for example, in ensuring the safety, avoiding micro short circuits, and adjusting the input power characteristics.

In the non-aqueous electrolyte secondary cell 1 of this embodiment, the negative electrode active material preferably has a D50-particle size of at least 2 μm but less than 8 μm. This can further reduce the temporary deterioration of the non-aqueous electrolyte secondary cell 1 and also can further improve the performance of the non-aqueous electrolyte secondary cell 1, for example, in ensuring the safety.

In the non-aqueous electrolyte secondary cell 1 of this embodiment, the ratio of the D90-particle size of the negative electrode active material with respect to the thickness of the negative electrode mixture layer is preferably at least 0.1 but not more than 0.5. This can further reduce the temporary deterioration of the non-aqueous electrolyte secondary cell 1. It should be noted that the thickness of the negative electrode mixture layer herein means the thickness of the layer applied onto one surface side of the negative electrode current collecting foil 13A.

Although this embodiment herein describes the non-aqueous electrolyte secondary cell as an example of the electric storage device, the electric storage device of the present invention is not limited to such a non-aqueous electrolyte secondary cell, and can be applied also to a capacitor, for example.

When the electric storage device of the present invention is used as a non-aqueous electrolyte secondary cell, the non-aqueous electrolyte secondary cell is suitably used as a lithium ion secondary cell. When the electric storage device of the present invention is used as a capacitor, the capacitor is suitably used as a lithium ion capacitor or an ultra capacitor.

Further, one embodiment of the vehicle mounted electric storage system of the present invention is described.

Vehicle Mounted Electric Storage System of the Present Embodiment

The vehicle mounted electric storage system of the present embodiment includes the above-mentioned electric storage device and a control unit that controls charge and discharge of the electric storage device.

For example, as shown in FIG. 8, a vehicle mounted electric storage system 100 of this embodiment includes the non-aqueous electrolyte secondary cell 1 that serves as the above-mentioned electric storage device, and a control unit 102 that controls charge and discharge of the non-aqueous electrolyte secondary cell 1.

Specifically, the vehicle mounted electric storage system 100 includes: an electric storage module 101 having a plurality of non-aqueous electrolyte secondary cells 1; and a control unit 102 that performs charge and discharge of the non-aqueous electrolyte secondary cells at a high rate and controls the charge and discharge.

In the case where the vehicle mounted electric storage system 100 is mounted on a vehicle 110, as shown in FIG. 8, the control unit 102 is connected to a vehicle control mechanism 111 that controls the engine, motors, drive system, electrical system, etc., via a vehicle communication network 112 such as vehicle LAN and CAN. The control unit 102 and vehicle control mechanism 111 communicate with each other, and the electric storage system 100 is controlled on the basis of the information obtained from the communication. Thus, a vehicle provided with the electric storage system 100 can be embodied.

As has been described above, the vehicle mounted electric storage system of this embodiment includes an electric storage device capable of reducing the temporary deterioration. Accordingly, such a vehicle mounted electric storage system can reduce the temporary deterioration. That is, the vehicle mounted electric storage system enables charge and discharge to be performed at a high rate while reducing the temporary deterioration. Accordingly, this vehicle mounted electric storage system is suitably mounted on hybrid vehicles that require charge and discharge to be performed at a high rate.

The electric storage device and the vehicle mounted electric storage system of this embodiment are as described above. However, the present invention is not limited to the above-mentioned embodiments, and the design can be appropriately modified within the scope intended by the present invention. The operational advantage of the present invention is also not limited to the foregoing embodiments.

The embodiments disclosed herein should be construed in all respects as illustrative but not limiting. The scope of the present invention is not indicated by the foregoing description but by the scope of the claims. Further, the scope of the present invention is intended to include all the modifications equivalent in the sense and the scope to the scope of the claims.

EXAMPLES

In the examples, effects of the negative electrode active material containing hard carbon, and the 3σ value of the local air resistance, in the Gurley air resistance test with an air orifice having a diameter of 5 mm, falling within a specific range were investigated.

First, methods for measuring various values in the examples and the comparative example are described below.

(3σ Value)

Figure 9A:
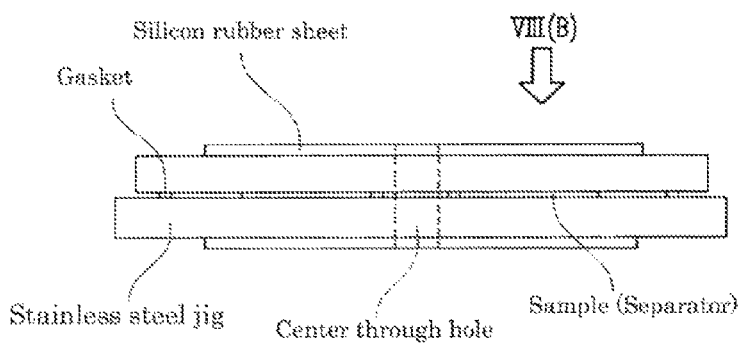
FIG. 9A is a side view schematically showing the periphery of a dedicated jig attached to a Gurley-type densometer in the later-mentioned examples.
Figure 9B:
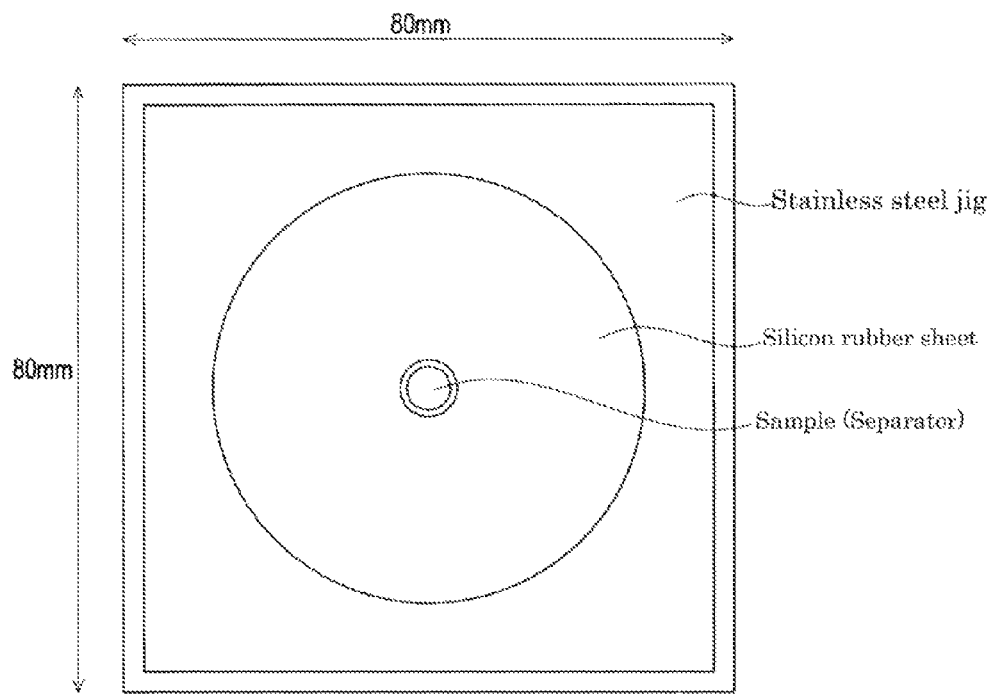
FIG. 9B is a plan view as viewed from the arrow VIII(B) of FIG. 9A.
Figure 10:
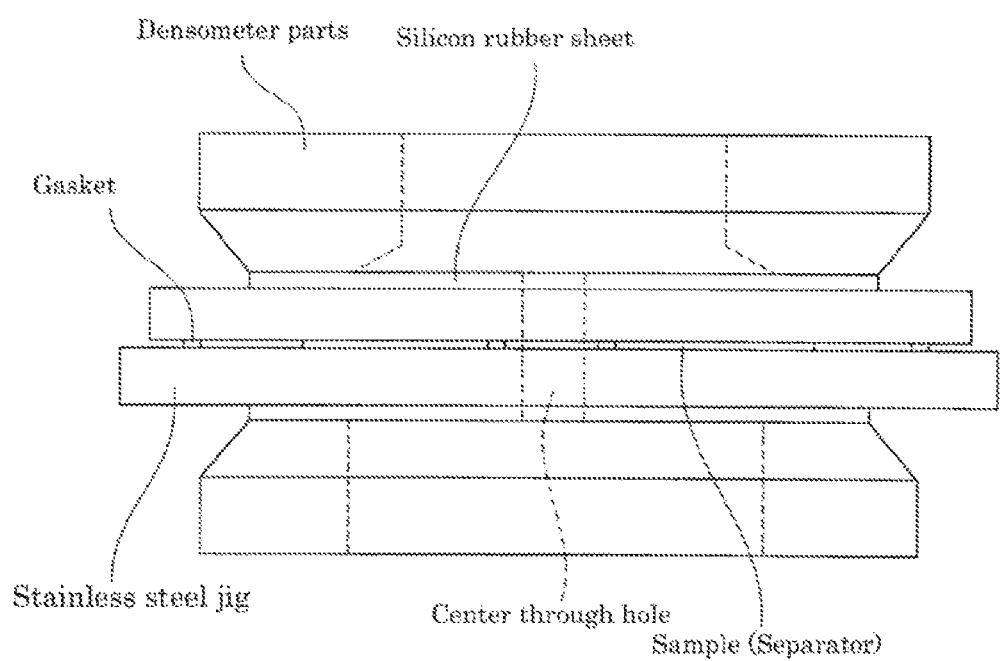
FIG. 10 is a side view schematically showing a tester for measuring the local air resistance in the examples, with the dedicated jig attached to the Gurley-type densometer.

As shown in FIG. 9A, FIG. 9B, and FIG. 10, a dedicated jig was inserted into a Gurley-type densometer (type: B-291102305, manufactured by Toyo Seiki Seisaku-sho, Ltd.) using a test method according to JIS P8117. Further, the diameter of the air orifice was adjusted to 5 mm, and a separator was clamped therein with a cylindrical support member. A fixing pressure was applied thereto in the up-down direction of FIG. 10, and the time required for a 10-cc air to pass through the air orifice (as a local resistance to the air permeating the separator from one surface to the other surface) was measured. Then, a 3σ value was obtained from the measured value. In FIG. 9A and FIG. 10, the diameter of the center through hole was 5 mm.

As shown in FIG. 6, the separator was measured at the points where 4 lines that were equally spaced in the TD direction intersect 4 lines that were spaced at 15 mm or more from one another in the MD direction, that is, 16 points in total.

(Air Resistance of Separator)

The air resistance of the separator was measured in accordance with JIS P8117. The air resistance was obtained by measuring the time required for a 100-cc air to permeate therethrough per prescribed area.

(Thickness of Separator)

The total thickness of the substrate and the inorganic layer formed on the substrate was taken as the thickness of the separator. The thickness was measured using a micrometer (manufactured by Mitutoyo Corporation).

(Particle Size of Negative Electrode Active Material)

For determining the particle size of the negative electrode active material, the particle volume distribution was determined by a laser diffraction light-scattering method. When 50% amount (cumulative distribution) of particles had a particle size of a specific particle size or smaller, the specific particle size was taken as an average particle size D50.

(Ratio of Particle Size (D90) of Negative Electrode Active Material with Respect to Thickness of Negative Electrode Mixture Layer 13B)

The ratio of the particle size (D90) of the negative electrode active material with respect to the thickness of the negative electrode mixture layer 13B was obtained by determining the particle volume distribution by a laser diffraction light-scattering method and calculating a value expressed as: the particle size (D90) at 90% by volume/the thickness of the negative electrode mixture layer.

Example 1

<Separator>

A polyolefin microporous film having a thickness of 5 μm was prepared as the substrate 12A. In Example 1, 35 parts by weight of high density polyethylene having a weight-average molecular weight of 600,000; 10 parts by weight of low density polyethylene having a weight-average molecular weight of 200,000; and a plasticizer (fluidized paraffin) as raw materials were mixed by melting and kneading in an extruder with a T-die mounted on the tip thereof. Then, the mixture was extruded, thereby producing a sheet with a thickness of 100 μm. This sheet was immersed into a diethyl ether solvent so that fluidized paraffin should be extracted and removed, followed by drying. Thus, a porous film before drawing was obtained. This porous film was drawn in biaxial directions inside a bath heated to 115 to 125° C., and was thereafter subjected to a heat treatment. Thus, a polyethylene microporous film was produced.

A coating agent was prepared by mixing alumina particles as inorganic particles, styrene-butadiene rubber as a binder, CMC (carboxymethylcellulose) as a thickener, ion-exchanged water as a solvent, and a surfactant. The ratio in the coating agent of the alumina particles and the binder was adjusted to 97:3. Next, this coating agent was applied onto the substrate 12A by gravure coating, which was then dried at 80° C. for 12 hours. Thereby, the inorganic layer 12B having a thickness of 5 μm was formed on the substrate 12A. Thus, the separator 12 yielding a 3σ value of 200 seconds/10 cc, and having a thickness of 20 μm and an air resistance of 1.20 seconds/1.00 cc was produced.

<Positive Electrode>

LiCoO$_2$ as a positive electrode active material, acetylene black as a conductive aid, and PVDF as a binder were mixed at a ratio of 90:5:5. To this mixture was added N-methylpyrrolidone (NMP) as a solvent. Thus, a positive electrode mixture was prepared. This positive electrode mixture was applied onto each of both sides of an Al foil as the positive electrode current collecting foil 11A having a thickness of 20 μm. After drying, it was subjected to compression molding by roll pressing. Thus, the positive electrode 11 with the positive electrode mixture layer 11B formed on the positive electrode current collecting foil 11A was produced.

<Negative Electrode>

Hard carbon (HC) having a particle size (D50) of 5 μm as a negative electrode active material and PVDF as a binder were mixed at a ratio of 95:5. To this mixture was added NMP as a solvent. Thus, a negative electrode mixture was prepared. This negative electrode mixture was applied onto each of both sides of a 15-μm thick Cu foil as the negative electrode current collecting foil 13A. After drying, it was subjected to compression molding by roll pressing. Thus, the negative electrode 13 with the negative electrode mixture layer 13B formed on the negative electrode current collecting foil 13A was produced.

In the thus produced negative electrode 13, the ratio of the particle size (D90) of the negative electrode active material with respect to the thickness of the negative electrode mixture layer 13B was 0.2.

<Power Generating Element>

Next, the positive electrode 11 and the negative electrode 13 were stacked together via the separator 12, which was then rolled up. At this time, the inorganic layer 12B of the separator 12 was faced with the positive electrode 11. Thus, the power generating element 10 was produced.

<Assembly>

Next, a current collector was attached to each of the positive electrode and the negative electrode of the power generating element 10. Thereafter, the power generating element 10 was arranged inside the body 3 of the case 2. Subsequently, the current collectors were each welded to the external terminal 21 attached to the cover plate 4. Further, the cover plate 4 was attached to the body 3.

Next, an electrolyte was poured. The electrolyte was prepared by dissolving $LiPF_6$ in a mixed solvent of propylene carbonate (PC): dimethyl carbonate (DMC): ethyl methyl carbonate (EMC)=3:2:5 (volume ratio) so as to yield 1 mol/L. By following the steps above, a lithium ion secondary cell of Example 1 was produced.

Example 2

A lithium ion secondary cell of Example 2 was produced basically in the same manner as in Example 1 except that the mixing ratio of the plasticizer (fluidized paraffin), the draw ratios in the MD and TD directions, and the sampling points (cut-out portions in the TD direction of the sheet) were changed in producing the separator. As a result, the separator of Example 2 yielded a 3σ value of 50 seconds/10 cc.

Example 3

A lithium ion secondary cell of Example 3 was produced basically in the same manner as in Example 1 except that the mixing ratio of the plasticizer (fluidized paraffin), the draw ratios in the MD and TD directions, and the sampling points were changed in producing the separator. As a result, the separator of Example 3 yielded a 3σ value of 120 seconds/10 cc.

Example 4

A lithium ion secondary cell of Example 4 was produced basically in the same manner as in Example 1 except that the mixing ratio of the plasticizer (fluidized paraffin), the draw ratios in the MD and TD directions, and the sampling points were changed in producing the separator. As a result, the separator of Example 4 yielded a 3σ value of 250 seconds/10 cc.

Example 5

A lithium ion secondary cell of Example 5 was produced basically in the same manner as in Example 1 except that the mixing ratio of the plasticizer (fluidized paraffin), the draw ratios in the MD and TD directions, and the sampling points were changed in producing the separator. As a result, the separator of Example 5 yielded a 3σ value of 350 seconds/10 cc.

Example 6

A lithium ion secondary cell of Example 6 was produced basically in the same manner as in Example 1 except that the mixing ratio of the plasticizer (fluidized paraffin), the draw ratios in the MD and TD directions, and the sampling points were changed in producing the separator. As a result, the separator of Example 6 yielded a 3σ value of 20 seconds/10 cc.

Example 7

A lithium ion secondary cell of Example 7 was produced basically in the same manner as in Example 1 except that the mixing ratio of the plasticizer (fluidized paraffin), the draw ratios in the MD and TD directions, and the sampling points were changed in producing the separator. As a result, the separator of Example 7 had an air resistance of 30 seconds/100 cc.

Example 8

A lithium ion secondary cell of Example 8 was produced basically in the same manner as in Example 1 except that the mixing ratio of the plasticizer (fluidized paraffin), the draw ratios in the MD and TD directions, and the sampling points were changed in producing the separator. As a result, the separator of Example 8 had an air resistance of 90 seconds/100 cc.

Example 9

A lithium ion secondary cell of Example 9 was produced basically in the same manner as in Example 1 except that the mixing ratio of the plasticizer (fluidized paraffin), the draw ratios in the MD and TD directions, and the sampling points were changed in producing the separator. As a result, the separator of Example 9 had an air resistance of 130 seconds/100 cc.

Example 10

A lithium ion secondary cell of Example 10 was produced basically in the same manner as in Example 1 except that the mixing ratio of the plasticizer (fluidized paraffin), the draw ratios in the MD and TD directions, and the sampling points were changed in producing the separator. As a result, Example 10 had a thickness of the separator of 15 μm.

Example 11

A lithium ion secondary cell of Example 11 was produced basically in the same manner as in Example 1 except that the mixing ratio of the plasticizer (fluidized paraffin), the draw ratios in the MD and TD directions, and the sampling points were changed in producing the separator. As a result, the separator of Example 11 had a thickness of 24 μm.

Example 12

A lithium ion secondary cell of Example 12 was produced basically in the same manner as in Example 1 except that the particle size (D50) of the negative electrode active material was 2 μm.

Example 13

A lithium ion secondary cell of Example 13 was produced basically in the same manner as in Example 1 except that the particle size (D50) of the negative electrode active material was 1 μm.

Example 14

A lithium ion secondary cell of Example 14 was produced basically in the same manner as in Example 1 except that the particle size (D50) of the negative electrode active material was 8 μm.

Example 15

A lithium ion secondary cell of Example 15 was produced basically in the same manner as in Example 1 except that the particle size (D50) of the negative electrode active material was 12 μm.

Example 16

A lithium ion secondary cell of Example 16 was produced basically in the same manner as in Example 1 except that the ratio of the particle size (D90) of the negative electrode active material with respect to the thickness of the negative electrode mixture layer 13B was 0.1.

Example 17

A lithium ion secondary cell of Example 17 was produced basically in the same manner as in Example 1 except that the ratio of the particle size (D90) of the negative electrode active material with respect to the thickness of the negative electrode mixture layer 13B was 0.4.

Example 18

A lithium ion secondary cell of Example 18 was produced basically in the same manner as in Example 1 except that the ratio of the particle size (D90) of the negative electrode active material with respect to the thickness of the negative electrode mixture layer 13B was 0.5.

Example 19

A lithium ion secondary cell of Example 19 was produced basically in the same manner as in Example 1 except that the ratio of the particle size (D90) of the negative electrode active material with respect to the thickness of the negative electrode mixture layer 13B was 0.7.

Example 20

A lithium ion secondary cell of Example 20 was produced basically in the same manner as in Example 1 except that the mixing ratio of the plasticizer (fluidized paraffin), the draw ratios in the MD and TD directions, and the sampling points were changed in producing the separator. As a result, the ratio of the D90-particle size of the negative electrode active material with respect to the thickness of the negative electrode mixture layer in Example 20 was 0.2.

Example 21

A lithium ion secondary cell of Example 21 was produced basically in the same manner as in Example 1 except that the mixing ratio of the plasticizer (fluidized paraffin), the draw ratios in the MD and TD directions, and the sampling points were changed in producing the separator. As a result, the separator of Example 21 had an air resistance of 20 s/100 cc.

Example 22

A lithium ion secondary cell of Example 22 was produced basically in the same manner as in Example 1 except that the mixing ratio of the plasticizer (fluidized paraffin), the draw ratios in the MD and TD directions, and the sampling points were changed in producing the separator. As a result, the separator of Example 22 had a thickness of 12 μm.

Example 23

A lithium ion secondary cell of Example 23 was produced basically in the same manner as in Example 1 except that the mixing ratio of the plasticizer (fluidized paraffin), the draw ratios in the MD and TD directions, and the sampling points were changed in producing the separator. As a result, the separator of Example 23 had a thickness of 26 μm.

Example 24

A lithium ion secondary cell of Example 24 was produced basically in the same manner as in Example 1 except that graphite (Gra) was used as the negative electrode active material instead of hard carbon.

Example 25

A lithium ion secondary cell of Example 25 was produced basically in the same manner as in Example 12 except that graphite was used as the negative electrode active material instead of hard carbon.

Example 26

A lithium ion secondary cell of Example 26 was produced basically in the same manner as in Example 14 except that graphite was used as the negative electrode active material instead of hard carbon.

Comparative Example 1

A lithium ion secondary cell of Comparative Example 1 was produced basically in the same manner as in Example 1 except that the mixing ratio of the plasticizer (fluidized paraffin), the draw ratios in the MD and TD directions, and the sampling points were changed in producing the separator. As a result, the separator of Comparative Example 1 yielded a 3σ value of 410 seconds/10 cc.

<Evaluation Method>

The lithium ion secondary cells of Examples 1 to 26 and Comparative Example 1 were evaluated for the temporary deterioration ratio, the incidence of short circuits, and the volume density of input power at low temperature. Further, the lithium ion secondary cells of Examples 1, 7 to 26 were evaluated for the temperature increase in a nail-inserted state. In each evaluation, the results obtained using three battery cells were averaged.

It should be noted that the air resistance of the separator or the particle size of the negative electrode active material in an already-produced battery cell were determined for evaluation as follows.

That is, when the separator is detached from the electric storage device, the electric storage device is disassembled in a discharge state (2V), and the separator is taken out therefrom and washed well with dimethyl carbonate (DMC). Thereafter, the separator is subjected to vacuum drying at 25° C. Then, the air resistance or local air resistance of the separator is determined.

Further, when the negative electrode is detached from the electric storage device, the electric storage device is disassembled in a discharge state (2V), the negative electrode taken out therefrom is washed with DMC, followed by vacuum drying at 25° C. The electrode is treated with a CP (Cross Section Polisher), and the thus obtained cross section is observed by SEM. At least 500 particles of the negative electrode active material are selected at random, to measure their diameter. Then, assuming that the particles have a spherical shape, the cumulative volume fraction in the particle size distribution from the smaller side is determined. The particle size when the cumulative volume exceeds 50% is taken as a D50-particle size, and the particle size when the cumulative volume exceeds 90% is taken as a D90-particle size.

The temporary deterioration ratio was determined using a resistance at 50% SOC. The SOC was adjusted to 50% by performing discharge at 1 C (A) and the minimum voltage of 2.4 V followed by charge at 0.5 C (A) for one hour. The current 1 C (A) herein means a current value that allows Q1 (Ah) to be conducted by applying the current for one hour when Q1 (Ah) is the capacity of the current discharged at the second time in the immediately previous discharge test at 25° C. and 4 A (in which, after constant current discharge at 4 A and the minimum voltage of 2.4 V, constant current charge at the maximum voltage of 4.1 V was performed, and then constant current discharge at 4 A and the minimum voltage of 2.4 V was performed again). First, the SOC was adjusted to 50%, and thereafter the resistance value D1 was determined by performing an output power test. The resistance D1 was obtained by applying a current of 20 C (A) in the discharge direction for 10 seconds at 25° C. and dividing, by the current, the difference between the voltage before the application of the current and the voltage after the application of the current for 10 seconds. Thereafter, charge in an amount of electricity discharged during the determination of D1 was performed at a current value of 6 A, so that the SOC was adjusted again to 50%. Continuous 1000 cycles each including a 30-second continuous discharge and a 30-second continuous charge within two minutes at a current of 10 C (A) and 50% SOC were performed. Then, an output power test was conducted at 50% SOC within two hours after the completion of the cycles (with the same time course in each example). Thus, a resistance value D2 was calculated. The deterioration ratio expressed as D2/D1 was calculated from the resistance values obtained above. Table 1 below shows the value of each example when the value of Example 1 is taken as 100%.

For calculating the incidence of short circuits, a charge at a constant voltage of 3.1 V, which is 20% of the rated capacity of the battery cell, was performed for three hours. Thereafter, the voltage was measured after a lapse of 1 to 12 hours, and measured again after a lapse of 20 days at 25° C., so that the difference in voltage was taken as the cell voltage decrease. 20 cells per standard were tested, and the proportion of the battery cells that underwent a cell voltage decrease of 0.1 V or more was calculated. Thus, the incidence of short circuits was calculated. Table 1 below shows the results.

The input test for determining charge performance was conducted as follows. After being left at 80% SOC and −10° C. for three hours, constant current and constant voltage charge was performed for one second under conditions of a current value of 50 C (A) and a constant voltage charge-starting voltage of 4.3 V.

The SOC was adjusted to 80% over 1.6 hours from a discharge state, at a current value of 0.5 C (A) and 25° C., where a current value that allows Q1 (Ah) to be conducted by applying the current for one hour is taken as 1 C (A) when Q1 (Ah) is the capacity of the current discharged in the immediately previous discharge test at 25° C. and 4 A (maximum voltage: 4.1 V; minimum voltage: 2.4 V), as described above.

In the case where the current value at the first second is set as the current maximum value, charge was performed at a higher rate. The charged electric energy W was calculated by: voltage at the first second×current value at the first second. The volume density of input power at low temperature expressed as W2/cell volume was obtained from the electric energy W. The cell volume was calculated from the outer dimensions of the cell case (excluding the protruding portions of the terminals).

The temperature increase in a nail-inserted state was obtained by inserting the below-described nail through the center of a battery cell charged under the following conditions, measuring the temperature on the surface of the battery cell, and calculating the percentage of temperature increase.

Temperature immediately before insertion of the nail: 25° C.

SOC: 80% (adjusted over 1.6 hours from a discharge state at a current value of 0.5 C and 25° C., when the capacity of the current fully discharged in the immediately previous discharge test at 25° C. and 4 A (maximum voltage: 4.1 V; minimum voltage: 2.4 V) for one hour is taken as 1 C)

Nail: φ1 mm, stainless steel, inserted through the center on the longitudinal side surface <Evaluation Results>

TABLE 1

| | 3σ value of local air resistance (s/10 cc) | Air resistance of separator (s/100 cc) | Thickness of separator (μm) | Negative electrode active material of negative electrode | D50 particle size of negative electrode active material of negative electrode (μm) | D90 particle size/Thickness of negative electrode mixture layer | Temporary deterioration ratio (percentage to Ex. 1 (%)) | Incidence of short circuits (%) | Volume density of input power at low temperature (%) | Temperature increase in nail-inserted state (%) |
|---|---|---|---|---|---|---|---|---|---|---|
| EX. 1 | 200 | 120 | 20 | HC | 5 | 0.2 | 100 | 0 | 100 | 100 |
| EX. 2 | 50 | 120 | 20 | HC | 5 | 0.2 | 99 | 0 | 102 | — |
| EX. 3 | 120 | 120 | 20 | HC | 5 | 0.2 | 100 | 0 | 101 | — |
| EX. 4 | 250 | 120 | 20 | HC | 5 | 0.2 | 101 | 0 | 99 | — |
| EX. 5 | 350 | 120 | 20 | HC | 5 | 0.2 | 103 | 0 | 98 | — |
| EX. 6 | 20 | 120 | 20 | HC | 5 | 0.2 | 98 | 10 | 102 | — |
| EX. 7 | 200 | 30 | 20 | HC | 5 | 0.2 | 99 | 0 | 103 | 130 |
| EX. 8 | 200 | 90 | 20 | HC | 5 | 0.2 | 100 | 0 | 101 | 110 |
| EX. 9 | 200 | 130 | 20 | HC | 5 | 0.2 | 105 | 0 | 100 | 95 |
| EX. 10 | 200 | 120 | 15 | HC | 5 | 0.2 | 102 | 0 | 98 | 128 |
| EX. 11 | 200 | 120 | 24 | HC | 5 | 0.2 | 99 | 0 | 96 | 98 |

TABLE 1-continued

| | 3σ value of local air resistance (s/10 cc) | Air resistance of separator (s/100 cc) | Thickness of separator (μm) | Negative electrode active material of negative electrode | D50 particle size of negative electrode active material of negative electrode (μm) | D90 particle size/Thickness of negative electrode mixture layer | Temporary deterioration ratio (percentage to Ex. 1 (%)) | Incidence of short circuits (%) | Volume density of input power at low temperature (%) | Temperature increase in nail-inserted state (%) |
|---|---|---|---|---|---|---|---|---|---|---|
| EX. 12 | 200 | 120 | 20 | HC | 2 | 0.2 | 98 | 0 | 105 | 110 |
| EX. 13 | 200 | 120 | 20 | HC | 1 | 0.2 | 98 | 0 | 108 | 113 |
| EX. 14 | 200 | 120 | 20 | HC | 8 | 0.2 | 108 | 0 | 92 | 99 |
| EX. 15 | 200 | 120 | 20 | HC | 12 | 0.2 | 114 | 0 | 89 | 99 |
| EX. 16 | 200 | 120 | 20 | HC | 5 | 0.1 | 104 | 0 | 104 | 108 |
| EX. 17 | 200 | 120 | 20 | HC | 5 | 0.4 | 108 | 0 | 101 | 98 |
| EX. 18 | 200 | 120 | 20 | HC | 5 | 0.5 | 112 | 0 | 97 | 96 |
| EX. 19 | 200 | 120 | 20 | HC | 5 | 0.7 | 116 | 0 | 93 | 90 |
| EX. 20 | 200 | 150 | 20 | HC | 5 | 0.2 | 123 | 0 | 95 | 80 |
| EX. 21 | 200 | 20 | 20 | HC | 5 | 0.2 | 99 | 20 | 104 | 140 |
| EX. 22 | 200 | 120 | 12 | HC | 5 | 0.2 | 118 | 20 | 102 | 175 |
| EX. 23 | 200 | 120 | 26 | HC | 5 | 0.2 | 98 | 0 | 83 | 90 |
| EX. 24 | 200 | 120 | 20 | Gra | 5 | 0.2 | 135 | 0 | 55 | 150 |
| EX. 25 | 200 | 120 | 20 | Gra | 2 | 0.2 | 128 | 0 | 60 | 176 |
| EX. 26 | 200 | 120 | 20 | Gra | 8 | 0.2 | 155 | 0 | 52 | 148 |
| C. EX. 1 | 410 | 120 | 20 | HC | 5 | 0.2 | 138 | 0 | 97 | — |

As shown in Table 1, Comparative Example 1 with a 3σ value exceeding 350 seconds/10 cc exhibited a higher temporary deterioration ratio than Examples 1 to 23 that used the same negative electrode active material.

On the other hand, Examples 1 to 23 in each of which the negative electrode active material contained hard carbon and the 3σ value of the local air resistance, in the Gurley air resistance test with an air orifice having a diameter of 5 mm, of the separator was at least 20 seconds/10 cc but not more than 350 seconds/10 cc exhibited a temporary deterioration ratio of not more than 123%, which value was lower than in Comparative Example 1 that used the same negative electrode active material.

It was confirmed from this that the temporary deterioration of the lithium ion secondary cell could be reduced in each of Examples by adjusting the 3σ value of the local air resistance, in the Gurley air resistance test with an air orifice having a diameter of 5 mm, of the separator to at least 20 seconds/10 cc but not more than 350 seconds/10 cc.

Further, it was found that, among Examples 1, 7 to 9, 20, and 21 which differed from one another only in air resistance of the separator, Examples 1, and 7 to 9 in each of which the separator had an air resistance of at least 30 seconds/100 cc but not more than 130 seconds/100 cc could further reduce the temporary deterioration, the incidence of short circuits, and the temperature increase in a nail-inserted state, as compared to Example 20 in which the air resistance exceeded 130 seconds/100 cc or Example 21 in which the air resistance was less than 30 seconds/100 cc.

Further, it was found that, among Examples 1, 10, 11, 22, and 23 which differed from one another only in thickness of the separator, Examples 1, 10, and 11 in each of which the separator had a thickness of at least 15 μm but not more than 24 μm could further reduce the temporary deterioration, the incidence of short circuits, and the temperature increase in a nail-inserted state, and could further improve the volume density of input power at low temperature, as compared to Example 22 in which the thickness was less than 15 μm or Example 23 in which the thickness exceeded 24 μm.

Further, Examples 1 to 5 and 7 to 19 in each of which the separator yielded a 3σ value of at least 50 seconds/10 cc but not more than 350 seconds/10 cc, an air resistance of at least 30 seconds/100 cc but not more than 130 seconds/100 cc, and a thickness of at least 15 μm but not more than 24 μm, and the negative electrode active material was hard carbon exhibited a temporary deterioration ratio of not more than 116%, an incidence of short circuits of 0%, to an volume density of input power at low temperature of at least 89%, and a temperature increase in a nail-inserted state of not more than 130%. Thus, lithium ion secondary cells with extremely excellent performance were achieved.

Further, it was found that, among Examples 1 and 12 to 15 which differed from one another only in particle size of the negative electrode active material, Examples 1 and 12 in each of which the negative electrode active material had a particle size of at least 2 μm but less than 8 μm could further reduce the temporary deterioration ratio and the temperature increase in a nail-inserted state, as compared to Example 13 in which the particle size was less than 2 μm or Examples 14 and 15 in which the particle size exceeded 6 μm.

Further, it was found that, among Examples 1 and 16 to 19 which differed from one another only in ratio of the D90-particle size of the negative electrode active material with respect to the thickness of the negative electrode mixture layer, Examples 1 and 16 to 18 in each of which the ratio was at least 0.1 but not more than 0.5 could further reduce the temporary deterioration ratio as compared to Example 19 in which the ratio exceeded 0.5.

Further, Examples 1 to 23 in each of which the negative electrode active material was hard carbon showed lower temporary deterioration than Examples 24 to 26 in each of which the negative electrode active material was graphite. It was seen from this that the temporary deterioration could be further reduced by the negative electrode active material containing hard carbon.

It should be noted that the inventors have arrived at an understanding that Examples 24 to 26 can reduce the temporary deterioration as compared to Comparative Example in which the same negative electrode active material as in Examples 24 to 26 was used, and the 3σ value was adjusted to be less than 20 seconds/10 cc or over 350 seconds/10 cc.

The embodiments of the present invention have been described and illustrated. It is intended from the beginning to combine the characteristic portions as appropriate in each of the embodiments described above. The embodiments and examples disclosed herein should be construed in all respects as illustrative but not limiting. The scope of the present invention is not indicated by the foregoing embodiments or examples but by the scope of the claims. The scope of the present invention is intended to include all the modifications equivalent in the sense and the scope to the scope of the claims.

What is claimed is:

1. An electric storage device comprising:
a positive electrode including a positive electrode substrate and a positive electrode mixture layer, the positive electrode mixture layer being formed on the positive electrode substrate and containing a positive electrode active material;
a negative electrode including a negative electrode substrate and a negative electrode mixture layer, the negative electrode mixture layer being formed on the negative electrode substrate and containing a negative electrode active material; and
a separator disposed between the positive electrode and the negative electrode, wherein
the separator yields a triple value of standard deviation of local air resistance of at least 20 seconds/10 cc but not more than 350 seconds/10 cc, the triple value of standard deviation of the local air resistance being calculated from measured values of a time period required for a 10 cc air to pass through an air orifice having a diameter of 5 mm at 16 sampling points in accordance with JIS P8117 with a Gurley-type densometer, the sampling points spaced at 15 mm or more from one another in a MD direction in which a raw material of the separator is conveyed to be formed into a sheet, the sampling points further being equally spaced 4 points in a TD direction perpendicular to the MD direction along a surface of the sheet wherein an air resistance is the time required for a gas with specific volume to permeate an object measured in units second/cc.

2. The electric storage device according to claim 1, wherein the separator has the air resistance of at least 30 seconds/100 cc but not more than 130 seconds/100 cc.

3. The electric storage device according to claim 1, wherein
the separator has a thickness of at least 15 μm but not more than 24 μm.

4. The electric storage device according to claim 1, wherein
the negative electrode active material contains hard carbon.

5. The electric storage device according to claim 1, wherein
the separator comprises: a sheet substrate containing a resin; and an inorganic layer having a higher content of inorganic particles than the substrate, and
the inorganic layer is disposed on at least one surface side of the substrate.

6. The electric storage device according to claim 1, wherein
the negative electrode active material has a D50-particle size of at least 2 μm but less than 8 μm.

7. The electric storage device according to claim 1, wherein
a ratio of a D90-particle size of the negative electrode active material with respect to a thickness of the negative electrode mixture layer is at least 0.1 but not more than 0.5.

8. The electric storage device according to claim 1, wherein
the triple value of standard deviation of the local air resistance is at least 50 seconds/10 cc but not more than 350 seconds/10 cc,
the separator has the air resistance of at least 30 seconds/100 cc but not more than 130 seconds/100 cc,
the separator has a thickness of at least 15 μm but not more than 24 μm,
the negative electrode active material is hard carbon,
the negative electrode active material has a D50-particle size of at least 2 μm but less than 8 μm, and
a ratio of a D90-particle size of the negative electrode active material with respect to a thickness of the negative electrode mixture layer is at least 0.1 but not more than 0.5.

9. A vehicle mounted electric storage system comprising:
the electric storage device according to claim 1; and
a control unit that controls charge and discharge of the electric storage device.

* * * * *